(12) United States Patent
Ohishi

(10) Patent No.: US 8,520,157 B2
(45) Date of Patent: Aug. 27, 2013

(54) DISPLAY DEVICE

(75) Inventor: Takuya Ohishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 254 days.

(21) Appl. No.: 13/062,216

(22) PCT Filed: Jul. 16, 2009

(86) PCT No.: PCT/JP2009/062908
§ 371 (c)(1),
(2), (4) Date: Mar. 3, 2011

(87) PCT Pub. No.: WO2010/032546
PCT Pub. Date: Mar. 25, 2010

(65) Prior Publication Data
US 2011/0193847 A1    Aug. 11, 2011

(30) Foreign Application Priority Data
Sep. 19, 2008 (JP) ................. 2008-241337

(51) Int. Cl.
G02F 1/1343 (2006.01)
G02F 1/1345 (2006.01)

(52) U.S. Cl.
USPC ............... 349/39; 349/38; 349/149; 349/151

(58) Field of Classification Search
USPC ..................... 349/38–39, 149, 151
See application file for complete search history.

(56) References Cited

U.S. PATENT DOCUMENTS

| | | | |
|---|---|---|---|
| 7,050,038 B2 | 5/2006 | Matsuda et al. | |
| 2003/0227429 A1 | 12/2003 | Shimoshikiryo | |
| 2003/0234904 A1 | 12/2003 | Matsuda et al. | |
| 2005/0213015 A1 | 9/2005 | Shimoshikiryo | |
| 2008/0062108 A1* | 3/2008 | Kim | 345/92 |
| 2009/0091671 A1 | 4/2009 | Tsubata et al. | |

FOREIGN PATENT DOCUMENTS

| | | |
|---|---|---|
| JP | H7-325317 A | 12/1995 |
| JP | H10-10572 A | 1/1998 |
| JP | 2004-021069 A | 1/2004 |
| JP | 2004-62146 A | 2/2004 |
| JP | 2005-338595 A | 12/2005 |
| JP | 2007-72033 A | 3/2007 |
| JP | 2008-112171 A | 5/2008 |
| WO | 2008/010334 A1 | 1/2008 |

OTHER PUBLICATIONS

International Search Report (ISR) issued in PCT/JP2009/062908 (International application) mailed in Aug. 2009 for Examiner consideration, citing U.S. Patent No. 1, U.S. Patent Application Publication Nos. 3-4 and Foreign Patent document Nos. 6-8 listed above.

* cited by examiner

*Primary Examiner* — Nathanael R Briggs
(74) *Attorney, Agent, or Firm* — Chen Yoshimura LLP

(57) ABSTRACT

When an active area (AA) side of CS trunk wiring groups (BB1, BB2) is viewed as the inner side, a feed portion (F) of at least one auxiliary capacitance bus line (CsL), which is a path for current flow from the active area (AA) to a point of connection on at least one of CS trunk wiring lines (bb) of each of the CS trunk wiring groups (BB1, BB2), is routed from a start point (S) on the active area (AA) side, through a region (R1) on the inner side of the point of connection, and to a region (R2) on the outer side of the point of connection and connected to the point of connection.

15 Claims, 7 Drawing Sheets

DISPLAY DEVICE

TECHNICAL FIELD

The present invention relates to a display device in which an auxiliary capacitance voltage is applied by a plurality of CS trunk wiring lines on an auxiliary capacitance bus line.

BACKGROUND ART

A liquid crystal display device of the multi-pixel drive method offers improved gamma characteristics dependence on view angle. In the multi-pixel drive, a single pixel is composed of two or more subpixels having different levels of brightness for improved view angle characteristics, that is, gamma characteristics dependence on view angle.

FIG. 7 shows a structural example of a pixel in such a liquid crystal display device of the multi-pixel drive method (see Patent Document 1, for example).

One pixel P is divided into two subpixels, sp1 and sp2. The subpixel sp1 includes a TFT 16a, a subpixel electrode 18a, and an auxiliary capacitance 22a, while the subpixel sp2 includes a TFT 16b, a subpixel electrode 18b, and an auxiliary capacitance 22b.

Gate electrodes of the TFT 16a and TFT 16b are connected to a mutually common gate bus line GL, and source electrodes are connected to a mutually common source bus line SL. The auxiliary capacitance 22a is formed between the subpixel electrode 18a and an auxiliary capacitance bus line CsL1, while the auxiliary capacitance 22b is formed between the subpixel electrode 18b and an auxiliary capacitance bus line CsL2. The auxiliary capacitance bus line CsL1 is formed in such a way as to extend in parallel with the aforementioned gate bus line GL with the region of the subpixel sp1 interposed between itself and the gate bus line GL. The auxiliary capacitance bus line CsL2 is formed in such a way as to extend in parallel with the aforementioned gate bus line GL with the region of the subpixel sp2 interposed between itself and the gate bus line GL.

Furthermore, the auxiliary capacitance bus line CsL1 of a pixel P is also the auxiliary capacitance bus line CsL2, with which the subpixel sp2 of another pixel P, which adjoins the aforementioned pixel P through the aforementioned auxiliary capacitance bus line CsL1, forms the auxiliary capacitance 22b; and the auxiliary capacitance bus line CsL2 of a pixel P is also the auxiliary capacitance bus line CsL1, with which the subpixel sp1 of another pixel P, which adjoins the aforementioned pixel P through the aforementioned auxiliary capacitance bus line CsL2, forms the auxiliary capacitance 22a.

A method of driving the auxiliary capacitance bus lines CsL1 and CsL2 in the display panel of the multi-pixel drive method will be described below with reference to FIG. 8 and FIG. 9.

As shown in FIG. 8, the auxiliary capacitance bus lines CsL (CsL designation is used, when CsL1 and CsL2 are not distinguished) are placed alternately in an active area AA, which is a display region, and connected to CS trunk wiring lines bb placed in a region adjoining the active area AA. A plurality of the CS trunk wiring lines bb forms a set of CS trunk wiring group BB. Only one set of CS trunk wiring group BB is formed in a region adjoining the active area AA on one end, which is a predetermined side, of the direction in which the auxiliary capacitance bus lines CsL extend, or in other words, only one set is formed in the region on one side. Alternatively, one set of the CS trunk wiring group BB is formed in a region adjoining the active area AA on one side, which is a predetermined side, of the direction in which the auxiliary capacitance bus lines CsL extend, and another set is formed in another region adjoining on the other side, or in other words, one CS trunk wiring group BB each is formed in the regions on both sides.

When the CS trunk wiring group BB is formed only in the region on one side, the ends of the auxiliary capacitance bus lines CsL on the aforementioned predetermined side are connected to the CS trunk wiring lines bb. When the CS trunk wiring groups BB are formed in the regions on both sides, one ends of the auxiliary capacitance bus lines CsL on the aforementioned predetermined side are connected to the CS trunk wiring lines bb in the region adjoining on the aforementioned one side, while the other ends of the auxiliary capacitance bus lines CsL are connected to the CS trunk wiring lines bb in the region adjoining the aforementioned other side. The CS trunk wiring lines bb extend in a direction orthogonal to the direction in which the auxiliary capacitance bus lines CsL1 and CsL2 extend. That is, the CS trunk wiring lines bb extend in the direction in which the source bus line SL extends.

An example is shown in FIG. 8 in which the CS trunk wiring groups BB, which include twelve CS trunk wiring lines bb, are disposed in both regions. Each auxiliary capacitance bus line CsL is connected to a single CS trunk wiring line bb in each CS trunk wiring group BB. The twelve auxiliary capacitance bus lines CsL (the number of CS trunk wiring lines bb constituting a CS trunk wiring group BB is also twelve or n (n is an even number)) are sequentially connected to mutually different CS trunk wiring lines bb in each of the CS trunk wiring groups BB, and the connective relationship is repeated for every twelve (or n) auxiliary capacitance bus lines.

When the CS trunk wiring group BB is formed only in one of the regions, the n number of auxiliary capacitance bus lines CsL, which are laid out sequentially, are connected to mutually different CS trunk wiring lines bb in the aforementioned CS trunk wiring group BB, and the sequential relationship is repeated for every n number of auxiliary capacitance bus lines.

Furthermore, separate auxiliary capacitance voltages, as shown in FIG. 9, are applied on each of n number of auxiliary capacitance bus lines CsL, which are laid out sequentially in both cases where the CS trunk wiring group BB is formed only in the region on one side and where the CS trunk wiring groups BB are formed in the regions on both sides. The auxiliary capacitance voltages Vcs (Vcs1, Vcs2, . . . in the figure) between the auxiliary capacitance bus lines CsL1 and CsL2, which correspond to the subpixels sp1 and sp2 in the same pixel P on the odd numbered lines, form waveforms of binary levels having the same level shift timings and the same periodicity but swing within different ranges. Furthermore, the auxiliary capacitance voltages Vcs, which form pairs, are set up in an n/2 number of pairs having phases which are slightly off among the odd numbered lines. Gate pulses Vg (Vg1, Vg3 . . . in the figure) on the odd numbered lines have a pulse period that lasts for a certain length of time and the timing of the end of the pulse period corresponds to a rising edge or a falling edge of the auxiliary capacitance voltages Vcs.

As a result, data signals are first written into the pixels P on the odd numbered lines; and, with a change in the auxiliary capacitance voltage Vcs after the data signal is written, different potential changes ΔV is added to the voltage levels of the pixel electrodes of the two subpixels sp1 and sp2 of the pixel P, to which the same data signals have been written, because of a feed-through phenomenon via the capacitance between the gate bus line GL and the pixel electrodes. As a result, the aforementioned sub-pixels sp1 and sp2 have different levels of brightness, and the average brightness, derived from an effective value of voltages applied on the liquid crystal throughout a single frame period of the auxiliary capacitance voltages Vcs, provides appropriate gamma characteristics for the entire pixel P within a wide range of view angles.

After a scan on an odd numbered line, a scan on an even numbered line is performed. In such an instance, the auxiliary capacitance voltages Vcs applied on the subpixels sp1 and sp2 belonging to the same pixel P do not form pairs having the same level shift timings as on an odd numbered line but nevertheless improves the gamma characteristics, because the first voltage shift of the pixel electrode after the end of the gate pulse is similar to that of the odd numbered line.

The waveforms and the method of scanning described above for the auxiliary capacitance voltages Vcs are only an example. The main aspect of this technology is the improvement in the gamma characteristics for the entire pixel P, which is achieved by making the brightness different between the subpixels sp1 and sp2 using different voltage shifts in the auxiliary capacitance voltage Vcs.

Since such auxiliary capacitance voltages Vcs are supplied through the CS trunk wiring lines bb, different auxiliary capacitance voltages Vcs are applied on respective CS trunk wiring lines bb in each CS trunk wiring group BB. Therefore, the auxiliary capacitance voltages Vcs having the same number of phases as the number of CS trunk wiring lines bb are supplied from a CS driver (not shown in the figure) to the CS trunk wiring group BB. FIG. 9 shows an example in which the auxiliary capacitance voltages Vcs are supplied in 12 phases. Furthermore, as shown in FIG. 8, when the CS trunk wiring groups BB are placed on both sides of the active area AA, the same auxiliary capacitance voltage Vcs is applied on the CS trunk wiring lines bb in both CS trunk wiring groups BB that are connected to the same auxiliary capacitance bus line CsL. Because an auxiliary capacitance voltage Vcs is supplied from both sides of the active area AA, the waveforms of the auxiliary capacitance voltage Vcs is less likely to be different at different locations in the active area AA in spite of wiring delays across a larger liquid crystal display panel.

RELATED ART DOCUMENTS

Patent Documents

Patent Document 1: Japanese Patent Application Laid-Open Publication No. 2004-62146 (published on Feb. 26, 2004)
Patent Document 2: Japanese Patent Application Laid-Open Publication No. 2007-72033 (published on Mar. 22, 2007)
Patent Document 3: Japanese Patent Application Laid-Open Publication No. 2005-338595 (published on Dec. 8, 2005)
Patent Document 4: Japanese Patent Application Laid-Open Publication No. H10-10572 (published on Jan. 16, 1998)
Patent Document 5: Japanese Patent Application Laid-Open Publication No. H7-325317 (published on Dec. 12, 1995)

SUMMARY OF THE INVENTION

Problems to be Solved by the Invention

However, as shown in FIG. 10, the liquid crystal display device of the multi-pixel drive method using the CS trunk wiring lines bb, which is a conventional art, includes the plurality of CS trunk wiring lines bb in each of the CS trunk wiring group BB, and as a result, distances d between the active area AA and respective CS trunk wiring lines bb are all different. The CS trunk wiring lines bb and the auxiliary capacitance bus lines CsL are formed of different metal layers. For example, the source metal may be used for the CS trunk wiring lines bb, and the gate metal may be used for the auxiliary capacitance bus lines CsL. Furthermore, the auxiliary capacitance bus lines CsL are extended across a region on the CS trunk wiring group BB isolated by an insulating film over the CS trunk wiring group BB and connected to the corresponding CS trunk wiring lines bb through contact holes 150 provided in the aforementioned insulating film.

As a result, the auxiliary capacitance bus line CsL that is connected to the CS trunk wiring line bb that is farther away from the active area AA has a longer feed portion F, which corresponds to the distance d between the active area AA and the point of connection (the contact hole 150) to the CS trunk wiring line bb, and the resistance in the wiring line becomes greater accordingly. While the number of CS trunk wiring lines is as few as 12, the number of auxiliary capacitance bus lines CsL is very large in the order of thousands, and consequently, the width of the auxiliary capacitance bus lines CsL needs to be much narrower than the CS trunk wiring lines bb.

Furthermore, the auxiliary capacitance voltages Vcs applied on the auxiliary capacitance bus lines CsL shift under an influence of the pixel electrode voltage levels. As a result, when the lengths of the feed portions F are not equal as described above and the auxiliary capacitance voltages Vcs fluctuate, the attenuation of the ripple voltages of the auxiliary capacitance voltages Vcs on the auxiliary capacitance bus line CsL at the end portion of the active area AA is different from one auxiliary capacitance bus lines CsL to another. FIG. 11 shows the differences in the ripple voltage attenuations. A waveform 101, which is in a solid line, is a waveform of the auxiliary capacitance voltage Vcs on the auxiliary capacitance bus line CsL having a feed portion F connected to a CS trunk wiring line bb on the outer side, at the end portion of the active area AA on the feed portion F side, i.e. on the auxiliary capacitance bus line CsL having a feed portion F with a long distance d between the active area AA and the CS trunk wiring line bb. A waveform 102, which is in a dotted line, represents a waveform of the auxiliary capacitance voltage Vcs on the auxiliary capacitance bus line CsL having a feed portion F connected to a CS trunk wiring line bb on the inner side, at the end portion of the active area AA on the side of the feed portion F, i.e. on the auxiliary capacitance bus line CsL having the feed portion F with a short distance d between the active area AA and the CS trunk wiring line bb. The ripple voltage in the waveform 101 is larger than the ripple voltage in the waveform 102.

When the magnitudes of the ripple voltages in the auxiliary capacitance voltages Vcs vary among the auxiliary capacitance bus lines CsL, as show in FIG. 8, the ripple voltages at the end portion of the active area AA form a range of distribution according to the positions of the auxiliary capacitance bus lines CsL. As a result, the levels of brightness of the subpixels sp1 and sp2 in the vicinity of the end portion of the active area AA, and therefore the levels of brightness in the pixels P, form a range of distributions, causing a problem of horizontal stripes appearing across the screen.

The present invention was devised in consideration of the problems described above, and is aiming at providing a display device in which a distribution of a variety of ripple voltages of the auxiliary capacitance voltages along the end portion of the active area is less likely to occur.

Means of Solving the Problems

In order to solve the problems described above, in the display device of the present invention one end of a plurality of auxiliary capacitance bus lines on a predetermined side is respectively connected through contact holes to at least one of CS trunk wiring lines of a CS trunk wiring group formed in such a way as to extend in a direction orthogonal to the direction in which the auxiliary capacitance bus lines extend in a region adjoining an active area of a display region on the one side of the direction in which the auxiliary capacitance bus lines extend; the other end of the auxiliary capacitance bus lines is respectively connected through contact holes to at least one CS trunk wiring line of a CS trunk wiring group formed in such a way as to extend in a direction orthogonal to the direction in which the auxiliary capacitance bus lines extend in an area adjoining the active area on the other side of the direction in which the auxiliary capacitance bus lines extend; and an auxiliary capacitance voltage is applied to each of the auxiliary capacitance bus lines through the connected CS trunk wiring line; and a feed portion, which is a current flow path segment of at least one auxiliary capacitance bus line from the active area to a point of connection on at least one CS trunk wiring line in at least one of the CS trunk wiring groups, originates on the active area side, passes through a region on an inner side of the point of connection, the inner side being the side of the active area with respect to each of the CS trunk wiring groups, is routed to a region on an outer side of the point of connection, and is connected to the point of connection.

According to the above invention, the resistance in the wiring line of the auxiliary capacitance bus line can be adjusted individually at the respective feed portion. As a result, it is possible to make the resistance in the wiring line in the feed portion uniform or similar among all the CS trunk wiring lines belonging to the same CS trunk wiring group. Therefore, the ripple voltages in the auxiliary capacitance voltages at the end portion of the active area become uniform or similar among the auxiliary capacitance bus lines. As a result, in a display device in which the auxiliary capacitance voltages are applied on both end sides of the active area, particularly in a large screen display device, it is possible to avoid the problem of visible horizontal stripes on the screen caused by non-uniformity in the levels of brightness among the pixels in the vicinity of the end portion of the active area.

The aforementioned has an effect of providing a display device which is less likely to have non-uniformity in the ripple voltages in the auxiliary capacitance voltages at the end portions of the active area.

In order to solve the above-mentioned issues, in a display device of the present invention, one end of a plurality of auxiliary capacitance bus lines on a predetermined side is respectively connected through contact holes to at least one of CS trunk wiring lines among a CS trunk wiring group formed in such a way as to extend in a direction orthogonal to the direction in which the auxiliary capacitance bus lines extend in a region adjoining an active area of a display region on the one side of the direction in which the auxiliary capacitance bus line extends; and an auxiliary capacitance voltage is applied on each of the auxiliary capacitance bus lines through the connected CS trunk wiring line; and a feed portion, which is a current flow path segment of the at least one auxiliary capacitance bus line from the active area to a point of connection on at least one CS trunk wiring line of the CS trunk wiring group, originates on the active area side, passes through a region on an inner side of the point of connection, the inner side being the side of the active area with respect to the group of CS trunk wiring lines, is routed to a region on an outer side of the point of connection, and is connected to the point of connection.

According to the above-mentioned invention, the resistance of the wiring line of the auxiliary capacitance bus line can be adjusted individually at the respective feed portion. As a result, it is possible to make the resistance in the wiring line in the feed portion uniform or similar among all the CS trunk wiring lines belonging to the same CS trunk wiring group. Therefore, the ripple voltages in the auxiliary capacitance voltages at the end portion of the active area become uniform or similar among the auxiliary capacitance bus lines. As a result, in a display device in which the auxiliary capacitance voltages are applied on one end side of the active area, it is possible to avoid the problem of visible horizontal stripes on the screen caused by non-uniformity in the levels of brightness among the pixels in the vicinity of the end portion of the active area.

The aforementioned has an effect of providing a display device which is less likely to have non-uniformity in the ripple voltages in the auxiliary capacitance voltages at the end portions of the active area.

In order to solve the aforementioned issues, in a display device of the present invention, a first wiring line is provided for the auxiliary capacitance bus line connected to a CS trunk wiring line that is not the CS trunk wiring line on the outermost side of said CS trunk wiring group, the first wiring line being formed in such a way as to extend from one point on the feed portion that is in a region on outer side of the point of connection to a region facing the outermost CS trunk wiring line.

According to the aforementioned invention, the first wiring line forms capacitance with other CS trunk wiring lines which the first wiring line faces, and as a result, it is possible to make the capacitances formed with all other CS trunk wiring lines not connected to the auxiliary capacitance bus line uniform among all the auxiliary capacitance bus lines. As a result, delays in the wiring lines of the auxiliary capacitance bus lines can be made uniform among all the auxiliary capacitance bus lines, and, consequently, an effect is obtained in which the levels of brightness among the pixels become even more consistent.

Furthermore, because the length of the first wiring line changes according to the length of the routing portion, it is possible to keep the overall capacitance constant, even when the routing portion forms capacitance of any size with other CS trunk wiring lines which are not connected. As a result, uniform brightness can be achieved through routing, regardless of the width of the wiring line of the CS trunk wiring lines. This is especially advantageous, because uniformity is achieved even with the CS trunk wiring lines with small wiring line widths, with which the number of CS trunk wiring lines that the routing portion faces, tends to vary greatly.

In order to solve the aforementioned issue, in the display device of the present invention, the aforementioned feed portion in a region on the outer side of the aforementioned point of connection has a smaller wiring line width than the aforementioned first wiring line.

According to the aforementioned invention, the routed feed portion makes a turn in a region on the outer side of the point of connection and then is connected to the point of connection. As a result, when the routed portion forms capacitances with other CS trunk wiring lines, it is possible to make the capacitance values similar to the size to the capacitances formed between the wiring line having a larger line width than the routed portion and a shorter length than the routed portion, and the aforementioned other CS trunk wiring lines. Therefore, it is possible to make the overall size of capacitances that the routed portion and the first wiring line form with the other CS trunk wiring lines more uniform among all the auxiliary capacitance bus lines.

In order to solve the aforementioned issues, in the display device of the present invention, at least the feed portion of the auxiliary capacitance bus line connected to a CS trunk wiring line that is not the CS trunk wiring line on the outermost side of the CS trunk wiring group is laid out with said routing; there is only one path for current flow in the routing that extends into a region on the outer side of the point of connection, from a point of access to the point of connection; and the wiring length of the path for current flow that extends from the point of access to the point of connection is greater for the feed portion connected to the CS trunk wiring line that is closer to the inner side.

According to the aforementioned invention, because the length of the wiring line of the current flow path from the point of access to the point of connection is greater for the feed portion connected to the CS trunk wiring line closer to the inner side, which is the CS trunk wiring line having a smaller distance from the active area, it is possible to make the line resistance of the auxiliary capacitance bus lines uniform or similar among all the CS trunk wiring lines in the same CS trunk wiring group. As a result, the ripple voltages in the auxiliary capacitance voltages at the end portion of the active area become uniform or similar among the auxiliary capacitance bus lines. As a result, for a display device in which the auxiliary capacitance voltages are applied on both end sides of the active area, particularly in the display device of a large screen size, it is possible to avoid a problem of visible horizontal stripes on the screen due to non-uniformity in brightness among the pixels in the vicinity of the end portion of the active area.

As a result, a display device in which a distribution of a variety of ripple voltages in the auxiliary capacitance voltages along the end portions of the active area is less likely to occur can be provided.

In order to address the aforementioned issue, in the display device of the present invention, second wiring lines are provided for the auxiliary capacitance bus line connected to a CS trunk wiring line that is not the CS trunk wiring line on the outermost side of the CS trunk wiring group, the second wiring lines being formed in such a way as to extend respectively from two different points on the feed portion in a region which faces the outermost CS trunk wiring line; and for the auxiliary capacitance bus line connected to a CS trunk wiring line that is not a CS trunk wiring line on the innermost side of the CS trunk wiring group, a segment of the feed portion that is in a region of the CS trunk wiring lines on the inner side of the connected CS trunk wiring line is a third wiring line, which is composed of two lines connected in parallel to each other.

According to the aforementioned invention, because the second wiring lines extend respectively from two different points, even when the line widths of the routed portion and of the second wiring lines on the outer side of the routed portion are made uniform, the area of a segment of the auxiliary capacitance bus line that faces the CS trunk wiring line in the region where the routed portion is formed is almost the same as the area of respective segments of the auxiliary capacitance bus lines facing other CS trunk wiring lines. As a result, even when the width of the wiring line of the routed portion is not adjusted with respect to the other wiring lines in order to adjust the capacitance, the overall capacitance the routed portion and two lines of second wiring form with other CS trunk wiring lines can be made even more uniform among all the auxiliary capacitance bus lines.

Furthermore, because the lengths of the second wiring lines change in accordance with the length of the routed portion, it is possible to achieve a constant overall capacitance even when the routed portion forms any capacitance with other CS trunk wiring lines to which it is not connected. Therefore, uniform brightness is achieved by routing, regardless of the line width of the CS trunk wiring lines. This is particularly advantageous, because uniformity is achieved even with the CS trunk wiring lines of small line widths, with which the number of CS trunk wiring lines the routed portion faces tends to vary greatly.

In order to address the aforementioned issues, in the display device of the present invention, at least one fourth wiring line is provided, which fourth wiring line is formed in such a way as to correspond to the auxiliary capacitive bus line having the second wiring lines and the third wiring lines, extends in parallel to the second wiring lines and the third wiring lines from the active area to a region facing the CS trunk wiring line on the outermost side of the CS trunk wiring group, and is electrically isolated from the second wiring lines and the third wiring lines.

According to the aforementioned invention, when a breakage occurs in the routed portion due to, for example, a manufacturing process, the routing portion is repairable by laser annealing of the fourth wiring line to the point which is open but still electrically connected to the point of connection.

In order to solve the aforementioned issue, in the display device of the present invention, the routing of the feed portion involves a plurality of paths for current flow paths.

According to the above invention, the routed portion achieves an overall low resistance, even when individual current flow paths have small line widths. Therefore, the feed portion can be routed using various current flow paths of small line widths even when a space for the formation of the routed portion is small.

In order to solve the aforementioned issues, in the display device of the present invention, each pixel is composed of a plurality of subpixels, and the plurality of subpixels in one pixel respectively auxiliary capacitances formed with different auxiliary capacitance bus lines.

According to the aforementioned invention, the display device of the multi-pixel drive method can be configured so that the distribution of a variety of brightness of the pixel in the vicinity of the end portion of the active area is less likely to occur.

In order to solve the aforementioned issues, in the display device of the present invention, the auxiliary capacitance voltages for subpixels in a pixel have binary level waveforms in which waveforms have same timings of level shifts and the same cycle, but oscillate within different ranges.

According to the aforementioned invention, the display device of the multi-pixel drive method is configured so that the differences in brightness among the subpixels in each pixel can be set accurately.

In order to solve the aforementioned issues, in the display device of the present invention, the timings of said level shifts of the auxiliary capacitance voltages differ among the CS trunk wiring lines connected to the auxiliary capacitance bus lines corresponding to different pixels.

According to the aforementioned invention, the display device of the multi-pixel drive method is configured so that the difference in brightness among the subpixels in each pixel can be created in the order of scanning of the pixel rows.

In order to solve the aforementioned issues, in the display device of the present invention, each pixel includes auxiliary capacitance that it forms with one of said auxiliary capacitance bus lines.

According to the aforementioned invention, a display device that does not perform the multi-pixel drive is configured so that the auxiliary capacitance bus lines can have wiring resistance between each other.

In order to solve the aforementioned issues, in the display device of the present invention, the auxiliary capacitance voltage is the same among all of said auxiliary capacitance bus lines.

According to the aforementioned invention, the same voltage can be applied on all the auxiliary capacitance bus lines using the plurality of CS trunk wiring lines.

In order to solve the aforementioned issues, in the display device of the present invention, it is a liquid crystal display device.

According to the aforementioned invention, a liquid crystal display device without a distribution of a variety of brightness is provided.

In order to solve the aforementioned issues, in the display device of the present invention, the CS trunk wiring lines of the CS trunk wiring group are formed of a source metal, and the auxiliary capacitance bus lines are formed of a gate metal.

According to the aforementioned invention, CS trunk wiring lines and auxiliary capacitance bus lines can be formed using existing materials.

Effect of the Invention

In a display device of the present invention, as described above, suppose the side of each of CS trunk wiring groups that is closer to the active area is the inner side, a feed portion of at least one of the auxiliary capacitance bus lines, which is the current flow path that extend from the active area to the point of connection on the CS trunk wiring line in at least one of the CS trunk wiring groups, originates on the active area side, passes across a region on the inner side of the aforementioned point of connection, is routed to the region on the outer side of the point of connection, and is connected to the point of connection.

In the display device of the present invention, as described above, suppose the side of a CS trunk wiring group that is closer to the active area is the inner side of the CS trunk wiring groups, a feed portion of at least one of the auxiliary capacitance bus lines, which is a current flow path that extends from the active area to the point of connection on the CS trunk wiring line in the CS trunk wiring group, originates on the side of the active area, passes across the region on the inner side of the point of connection, is routed to the region on the outer side of the point of connection, and is connected to the point of connection.

As described above, a display device that is less likely to produce distribution of various ripple voltages in the auxiliary capacitance voltages at the end portion of the active area can be provided.

DETAILED DESCRIPTION OF EMBODIMENTS

An embodiment of the present invention is described below with reference to FIG. 1 through FIG. 6.

Figure 6:
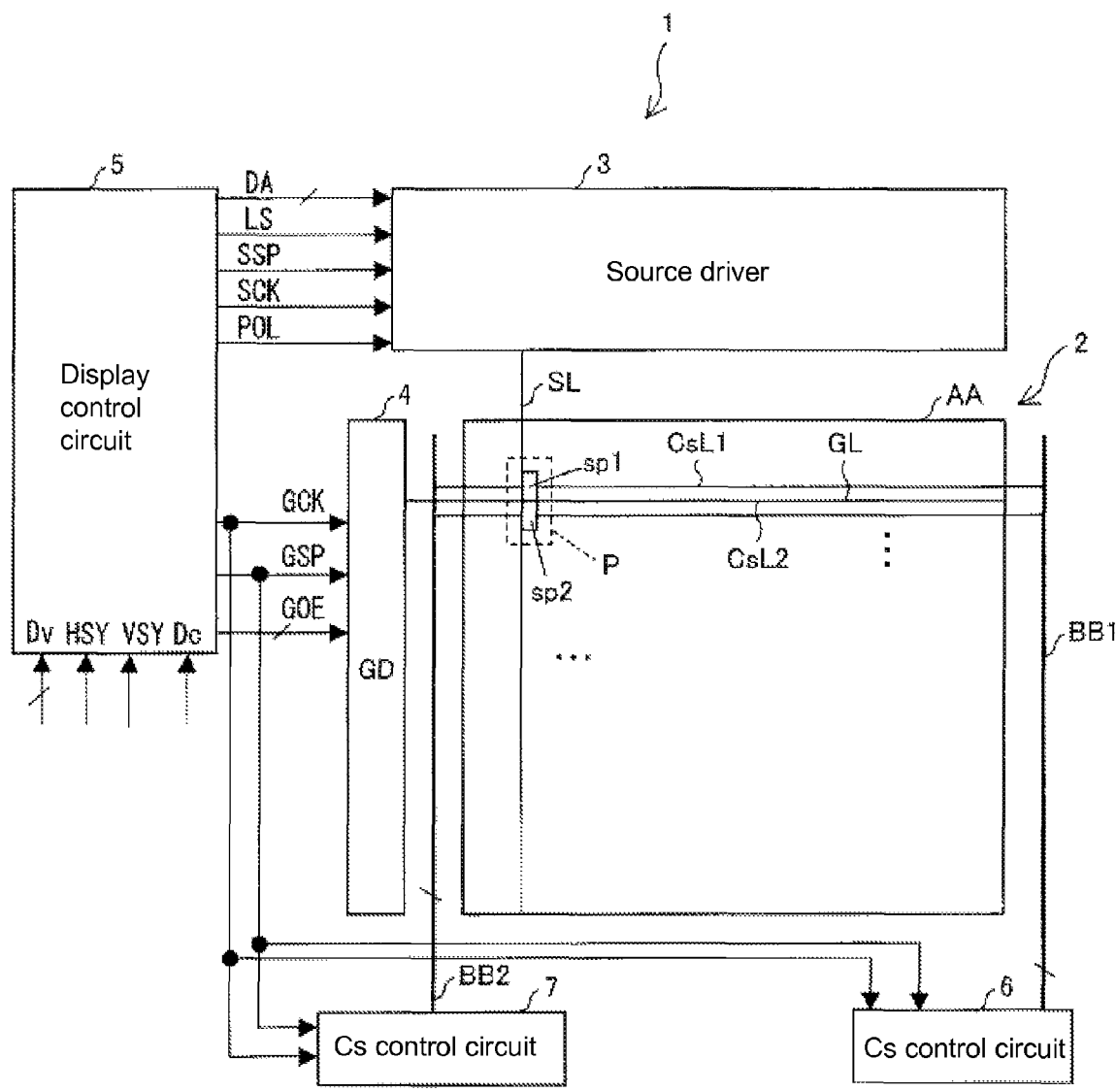
FIG. 6 shows an embodiment of the present invention and is a block diagram of the structure of a display device.

FIG. 6 shows the structure of a liquid crystal display device (display device) 1 according to the present embodiment. As shown in the figure, the liquid crystal display device 1 includes a display region 2, a source driver 3, a gate driver 4, a display control circuit 5, and Cs control circuits 6 and 7. These elements may either be mounted on a single panel, or all or some of the source driver 3, gate driver 4, display control circuit 5, and Cs control circuits 6 and 7 may be mounted on an external board, such as a flexible printed substrate, which is connected to a panel that includes the display region 2. Any appropriate layout is possible.

Figure 7:
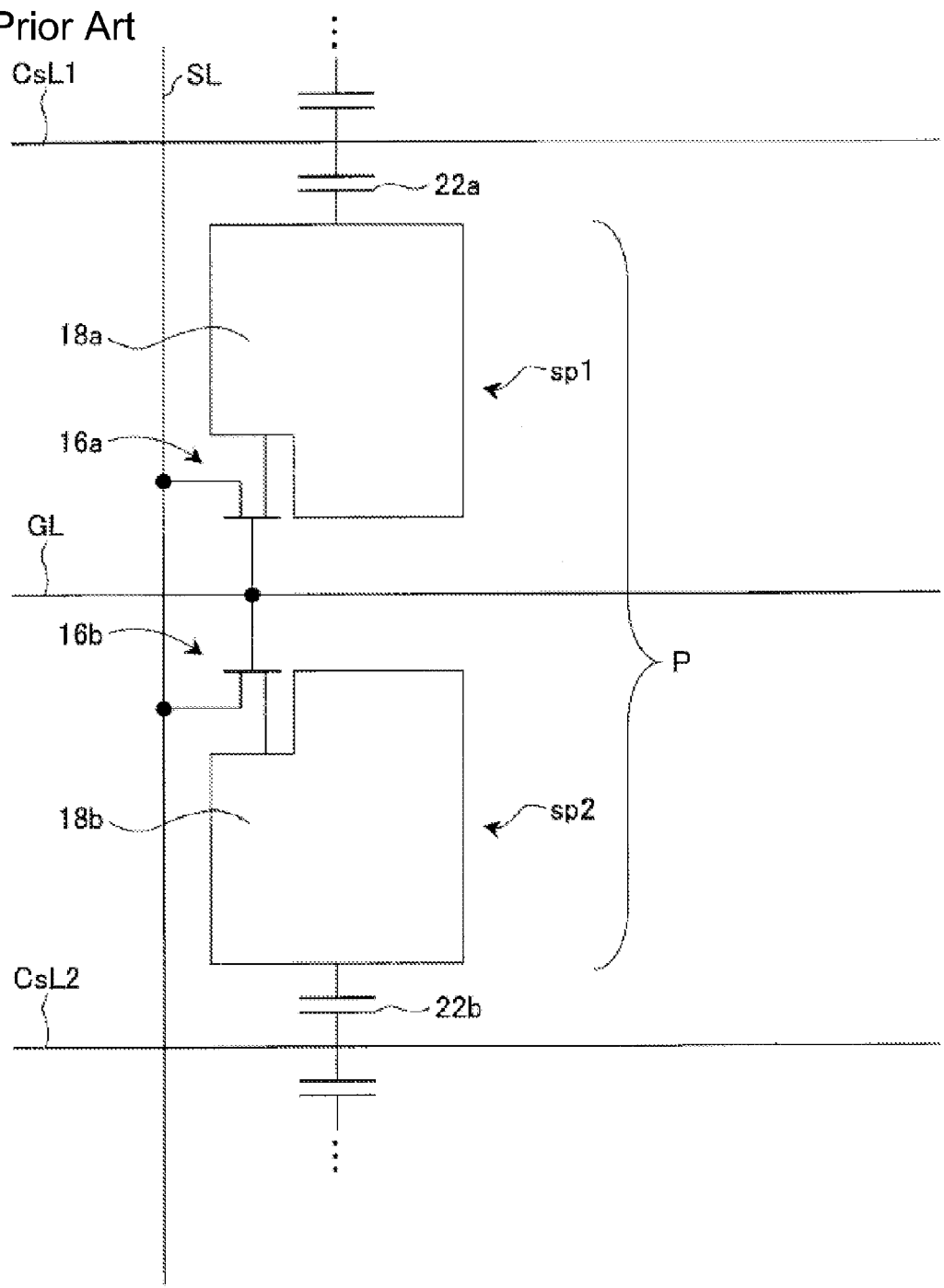
FIG. 7 shows a conventional art and is a circuit diagram showing the structure of an pixel of the multi-pixel drive method.

The display region 2 includes an active area AA, which is a region where pixels P composed of subpixels sp1 and sp2 as described with reference to FIG. 7 are arranged in a matrix; a plurality of gate bus lines GL . . . ; a plurality of source bus lines SL . . . ; a plurality of auxiliary capacitance bus lines CsL1 . . . CsL2 . . . ; and two CS trunk wiring groups BB1 and BB2. In a manner similar to FIG. 7, the gate bus line GL and the source bus line SL are formed in such a way as to cross each other and are connected to the pixels P, and the auxiliary capacitance bus lines CsL1 and CsL2 are connected to the subpixels sp1 and sp2. The CS trunk wiring group BB1 is formed in a region adjoining the active area AA on one side of the direction in which the auxiliary capacitance bus lines CsL (a combined reference character for CsL1 and CsL2) extend. The CS trunk wiring group BB2 is formed in a region adjoining the active area AA on the other side of the direction in which the auxiliary capacitance bus lines CsL extend. The auxiliary capacitance bus lines CsL are connected to the CS trunk wiring groups BB1 and BB2.

The display control circuit 5 controls the source driver 3, the gate driver 4, and the Cs control circuits 6 and 7. The display control circuit 5 receives from an external signal source (a tuner, for example) a digital video signal Dv representing an image to be displayed; a horizontal synchronizing signal HSY and a vertical synchronizing signal VSY for the aforementioned digital video signal Dv; and a control signal Dc for controlling the display operation. Furthermore, the display control circuit 5 generates and provides as an output, based on the received signals Dv, HSY, VSY, and Dc, signals for displaying the image represented by the digital video signal Dv on the display region 2, which includes a data start pulse signal SSP, a data clock signal SCK, a latch strobe signal LS, a digital image signal DA representing the image to be displayed (signal corresponding to the video signal Dv), a gate start pulse signal GSP, a gate clock signal GCK, and a gate driver output control signal (scanning signal output control signal) GOE.

More specifically, the display control circuit 5 outputs the video signal Dv as the digital image signal DA, after making timing adjustments on it as necessary using an internal memory; generates the data clock signal SCK, which is a signal of pulses corresponding to each pixel in the image represented by the digital image signal DA; generates the data start pulse signal SSP which, based on the horizontal synchronization signal HSY, goes to the high level (H level) only for a predetermined period of time in each horizontal scan period; generates the gate start pulse signal GSP which, based on the vertical synchronizing signal VSY, goes to the H level only for a predetermined period of time in each frame period (each vertical scan period); generates the gate clock signal GCK based on the horizontal synchronizing signal HSY; and generates the latch strobe signal LS and the gate driver output control signal GOE based on the horizontal synchronizing signal HSY and control signal Dc.

Among the signals generated by the display control circuit as described above, the digital image signal DA, latch strobe signal LS, a signal POL for controlling the polarity of a signal voltage (data signal voltage), the data start pulse signal SSP, and the data clock signal SCK are input to the source driver 3, while the gate start pulse signal GSP, the gate clock signal GCK, and the gate driver output control signal GOE are input to the gate driver 4.

Based on the digital image signal DA, data clock signal SCK, latch strobe signal LS, data start pulse signal SSP, and the polarity inversion signal POL, the source driver 3 sequentially generates a data signal, which is an analog voltage corresponding to an pixel value in each scan signal line for an image represented by the digital image signal DA, for each horizontal scan period and outputs the data signals to the source bus line SL.

Based on the gate start pulse signal GSP, gate clock signal GCK, and gate driver output control signal GOE, the gate driver 4 generates scan signals, outputs them to the gate bus line GL, and thus selectively drives the gate bus line GL.

As the source driver 3 and the gate driver 4 drive the source bus lines SL . . . and the gate bus lines GL . . . in the display region 2 as described above, signal voltages are written to the subpixel electrodes from the source bus line SL through TFTs connected to the selected gate bus line GL. As a result, a voltage corresponding to the digital image signal DA is applied on a liquid crystal layer of the subpixel, which is included in each pixel; the applied voltage controls the amount of light transmitted from a backlight; and the image represented by the digital video signal Dv is displayed in the pixels.

The CS control circuits 6 and 7 are circuits for controlling the phase and cycle, for example, of the auxiliary capacitance voltage Vcs for controlling the voltage level of the auxiliary capacitance bus lines CsL, based on the gate start pulse signal GSP and the gate clock signal GCK, which are outputted from the display control circuit 5. The CS control circuit 6 outputs the auxiliary capacitance voltages Vcs to the CS trunk wiring group BB1, while the Cs control circuit 7 outputs the auxiliary capacitance voltages Vcs to the CS trunk wiring group BB2.

The wiring configuration for the auxiliary capacitance bus line CsL and the CS trunk wiring line bb will be described next with reference to FIG. 1 and FIG. 2.

Figure 8:
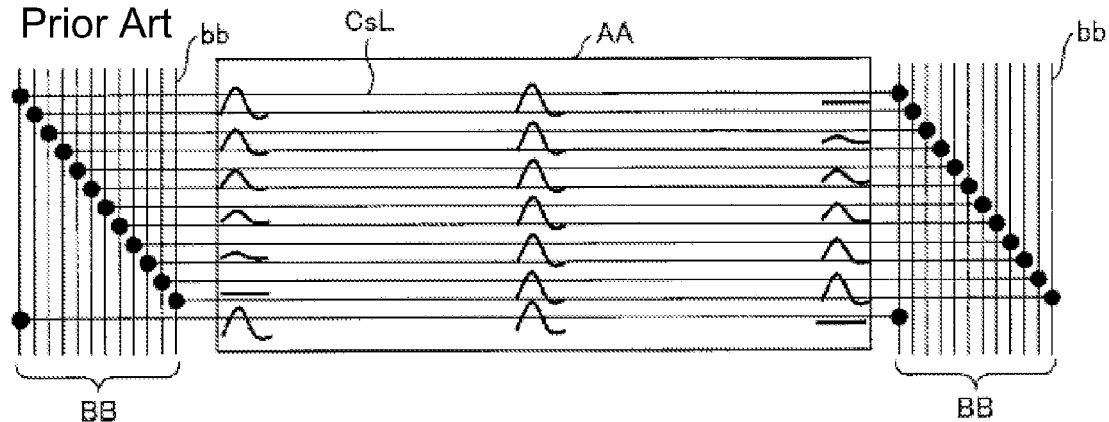
FIG. 8 shows a conventional art and is a plan view showing the layout of auxiliary capacitance bus lines and CS trunk wiring lines.
Figure 9:
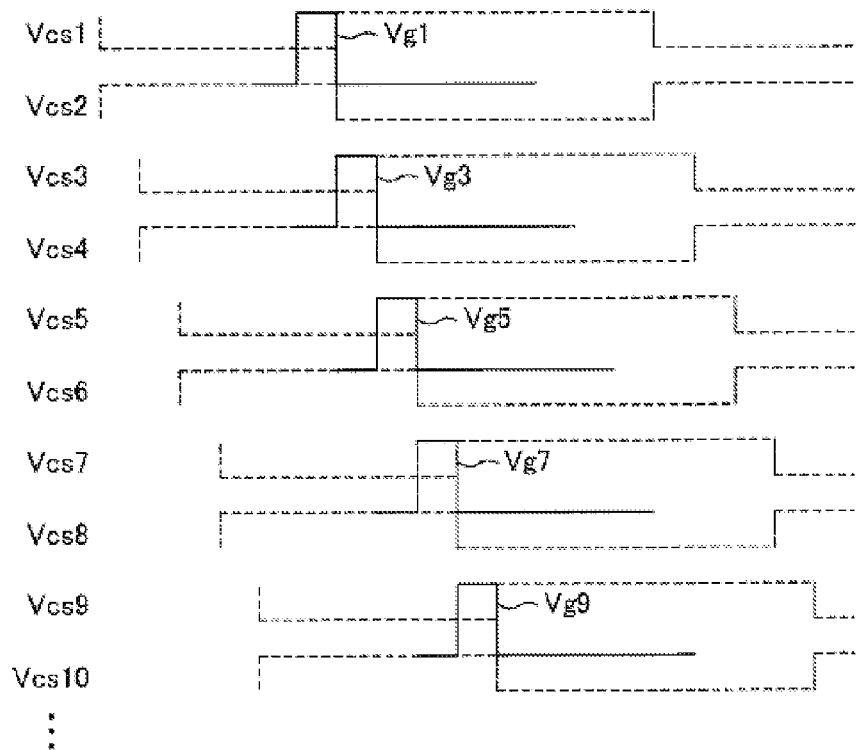
FIG. 9 is a waveform diagram showing an example of waveforms of auxiliary capacitance voltages supplied to pixels shown in FIG. 8.
Figure 10:
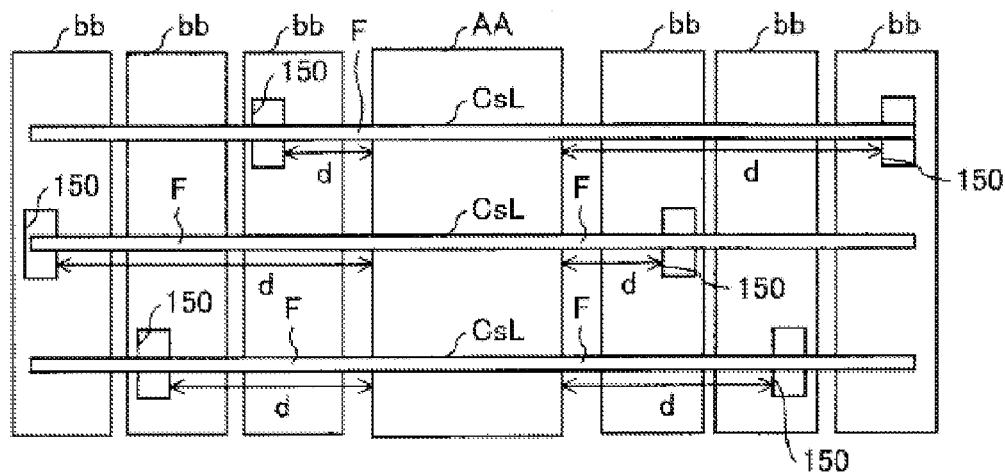
FIG. 10 shows a conventional art and is a plan view diagram showing the structure of an auxiliary capacitance bus line and a CS trunk wiring line.
Figure 11:
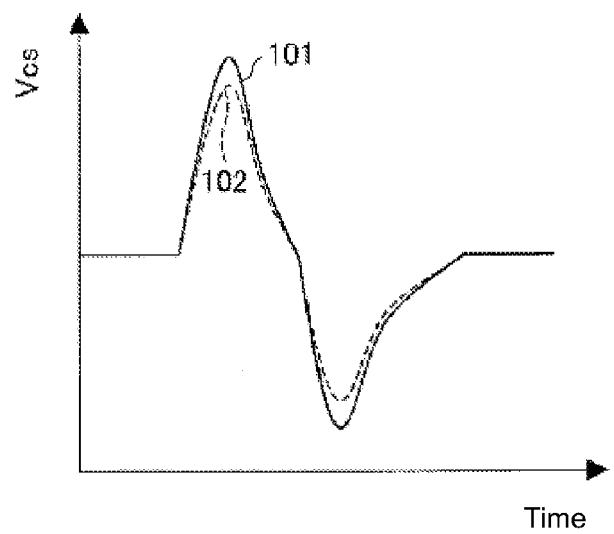
FIG. 11 is a waveform diagram showing waveforms of ripple voltages in the auxiliary capacitance voltages shown in FIG. 9.

The CS trunk wiring lines bb have already been described with reference to FIG. 8 and FIG. 10. The CS trunk wiring groups BB1 and BB2 in FIG. 2 respectively correspond to the CS trunk wiring groups BB shown in FIG. 8, and a contact hole 35 in FIG. 1 corresponds to a contact hole 150 in FIG. 10. Only one of the CS trunk wiring group BB1 and the CS trunk wiring group BB2 may be provided. However, when two CS trunk wiring groups BB1 and BB2 supply the auxiliary capacitance voltages Vcs from both sides of the active area AA, location-based variation in wiring delays caused by the resistance and capacitance of the auxiliary capacitance bus lines CsL, where a large current flows through for charging and discharging, can be suppressed. Furthermore, the CS trunk wiring lines bb in the CS trunk wiring group BB1 and the CS trunk wiring group BB2 are respectively driven by the CS control circuits 6 and 7 in the same manner described earlier with reference to FIG. 9.

Figure 1:
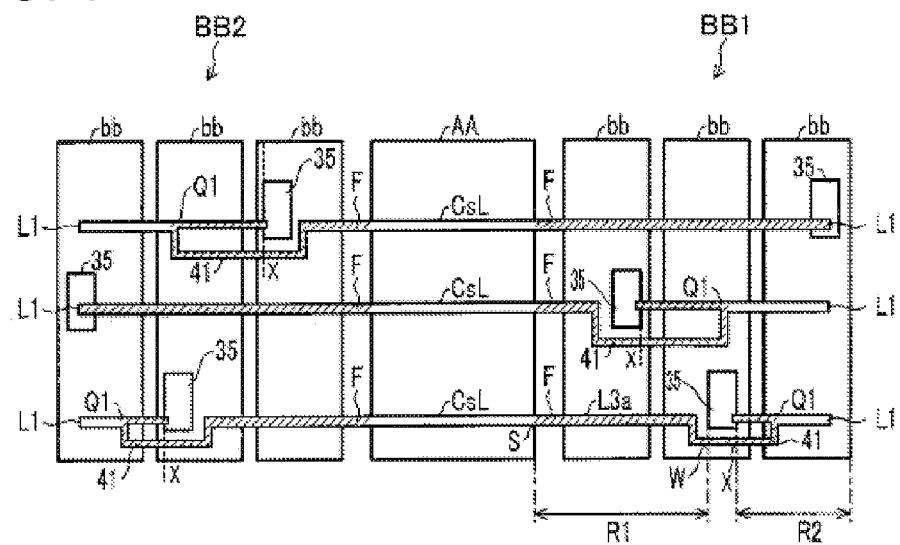
FIG. 1 shows an embodiment of the present invention and is a plan view showing the structure of auxiliary capacitance bus lines and CS trunk wiring lines.
Figure 2:
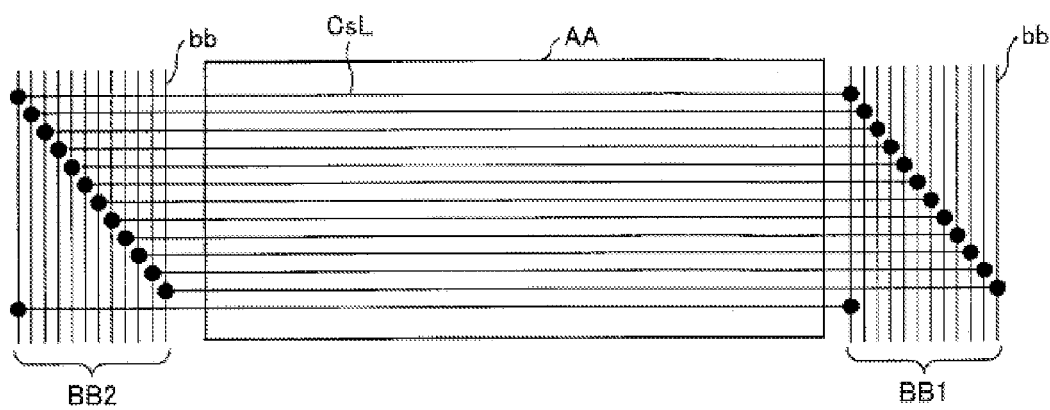
FIG. 2 is a plan view showing a layout of the auxiliary capacitance bus lines and the CS trunk wiring lines.

In this embodiment, as shown in FIG. 1, suppose the sides of the CS trunk wiring groups BB that faces the active area AA is "inside," the auxiliary capacitance bus lines CsL connected at least to the CS trunk wiring line bb that is not the CS trunk line bb on the outermost side of the CS trunk wiring groups BB have feed portions F (shown in the figure as shaded areas), which are paths for current flowing from the active area AA to the points of connection (locations where the contact holes 35 are formed) with the CS trunk wiring line bb. The feed portion F, as indicated, for example, by the auxiliary capacitance bus line CsL connected to the second CS trunk wiring line bb from the innermost side of the CS trunk line group BB1, originates at a start point S, which is on the active area AA side, passes through a region R1 (a portion from the point S to a point W), which is a region on the inner side of the point of connection, is routed to a region R2, which is a region on the outer side of the point of connection (a routing portion 41 from a point X to the point of connection), and then connected to the point of connection. As a result, the wiring resistance of the auxiliary capacitance bus line CsL can be adjusted for individual feed portion F. As a result, the wiring resistance of the feed portions F can be made uniform or similar among all the CS trunk wiring lines bb belonging to the CS trunk wiring group BB1 or BB2.

Furthermore, the routing portion 41 constitutes a single path for current flowing from the point X, which is the point of access to the region R2, to the point of connection, and the wiring length of the routing portion 41 is longer for the feed portion F that is connected to the CS trunk wiring line bb closer to the inner side.

Because the resulting wiring length of the routing portion 41 is longer for the feed portion F that is connected to the CS trunk wiring line bb closer to the inner side, which is the CS trunk wiring line bb having a smaller distance to the active area AA, it is possible to make the wiring resistance of the feed portions F uniform or similar among all of the CS trunk wiring lines bb that belong to the CS trunk wiring group BB1 or BB2. Although the wiring length of the routing portion 41 does not necessarily need to be made the same between the CS trunk wiring group BB1 and the CS trunk wiring group BB2, it is preferable to make them the same so that the resistance in the feed portions F would be the same between the CS trunk wiring group BB1 and the CS trunk wiring group BB2.

With the structure described above, the ripple voltages in the auxiliary capacitance voltages Vcs at the end portion of the active area AA become uniform or similar among the auxiliary capacitance bus lines CsL. As a result, the problem of visible horizontal stripes appearing on the screen, due to non-uniformity in the levels of brightness in the subpixels sp1 and sp2, and therefore among the pixels P in the vicinity of the end portion of the active area AA, is avoided. The effect of avoiding this problem is significant in a display device in which auxiliary capacitance voltages are applied from both ends of the active area, and particularly on a display device having a large screen. The effect of avoiding this problem can also be obtained, of course, in a display device in which the auxiliary capacitance voltage is applied from one side of the active area, and the display size can be made that much larger.

Furthermore, the auxiliary capacitance bus lines CsL, connected to the CS trunk wiring lines bb that are not the CS trunk wiring lines bb on the outermost side of the CS trunk wiring groups BB1 and BB2, include a wiring line L1 (first wiring line), which extends from a point on the feed portion F in the region R2, i.e. a point Q1 on the routing portion 41, to a region facing the CS trunk wiring line bb on the outermost side. Because the wiring line L1 forms capacitance with other CS trunk wiring lines bb, which the wiring line L1 faces, it is possible to make the capacitance, formed between the auxiliary capacitance bus line CsL and all the other CS trunk wiring lines bb, which are not connected, the same among all of the auxiliary capacitance bus lines CsL. Therefore, it is possible to make the wiring delays in the auxiliary capacitance bus lines CsL the same among all the auxiliary capacitance bus lines CsL and make the brightness of the pixels P even more consistent.

Because the length of the wiring line L1 changes according to the length of the routing portion 41, it is possible to keep the overall capacitance constant, even when the routing portion 41 forms capacitance of certain size with the other CS trunk wiring lines bb, which are not connected. As a result, uniform brightness can be achieved by routing, regardless of the width of the wiring lines of the CS trunk wiring lines bb. This is especially advantageous, because uniformity is achieved even with the CS trunk wiring lines bb having small wiring line widths, with which the number of CS trunk wiring lines that the routing portion 41 faces varying greatly.

The wiring line width of the routing portion 41 is smaller than that of the wiring line L1, and it is specifically a half thereof in this example. Because the routing portion 41 makes a turn in the region R2 and is connected to the point of connection, the capacitance formed between the routing portion 41 and other CS trunk wiring lines bb can be made close to (or almost the same as) the capacitance formed between the wiring line having a larger line width than the routing portion 41 (twice the line width of the routing portion 41 in this example) and a shorter length than the routing portion 41 (half the length of the routing portion 41 here), and the other aforementioned CS trunk wiring lines bb. As a result, the total size of the capacitance formed between the routing portion 41 and the other CS trunk wiring lines bb, and between the routing line L1 and the other CS trunk wiring lines bb can be made even more uniform among all the auxiliary capacitance bus lines CsL.

Figure 4:
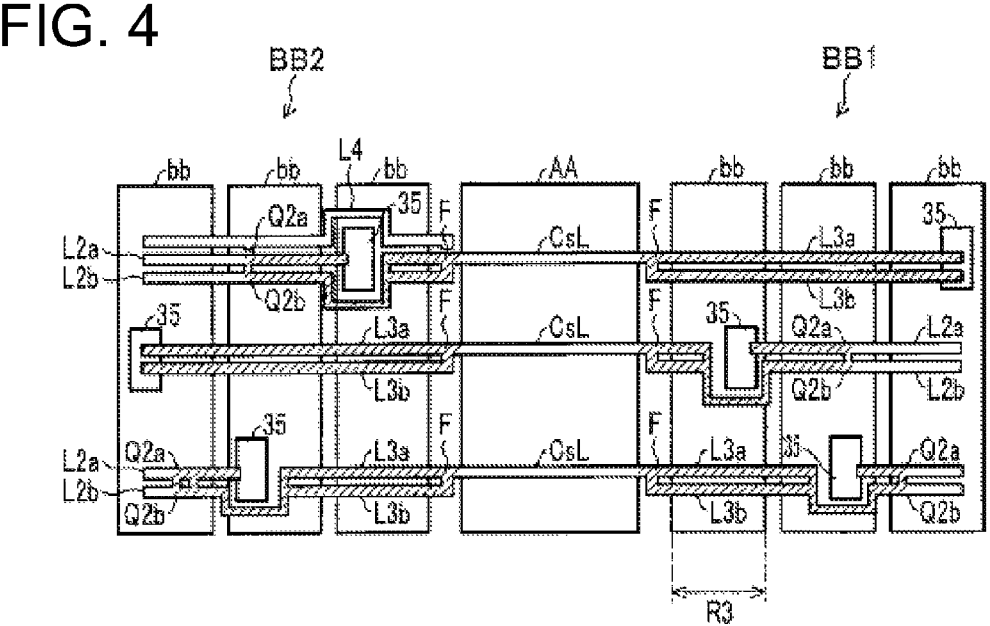
FIG. 4 shows another embodiment of the present invention and is a plan view showing the structure of an auxiliary capacitance bus lines and CS trunk wiring lines.

Next, FIG. 4 shows another wiring configuration of the auxiliary capacitance bus line CsL and the CS trunk wiring lines bb. Unless specifically stated otherwise, members having the same reference characters as in FIG. 1 provide the same functions.

In FIG. 4, for the auxiliary capacitance bus lines CsL connected to the CS trunk wiring lines bb that are not the CS trunk wiring lines bb on the outermost side in the CS trunk wiring groups BB1 and BB2a, wiring lines L2a and L2b extending respectively, as second wirings, from points Q2a and Q2b, which are two different points on the feed portion F in the region R2 (line L2a corresponds to point Q2a and line L2b corresponds to point Q2b), to the region facing the CS trunk wiring line on the outermost side are provided.

Furthermore, for the auxiliary capacitance bus line CsL connected to the CS trunk wiring lines bb that are not the CS trunk wiring line bb on the innermost side in the CS trunk wiring groups BB1 and BB2, a portion of the feed portion F in a region that includes the CS trunk wiring line bb on the inner side of the connected CS trunk wiring line bb, for example a region R3, which includes the CS trunk wiring line bb on the innermost side of the CS trunk wiring group BB1, is composed of two wiring lines L3a and L3b, which are third wiring lines connected parallel to each other.

According to this, the wiring line L2a extends from the point Q2a, and the wiring line L2b extends from the point Q2b. As a result, even when the widths of the wiring lines of the routing portion 41 are set to match the width of the wiring lines L2a and L2b, which are on the outer side of the routing portion 41, the size of the area of a segment of the auxiliary capacitance bus line CsL facing the CS trunk wiring lines bb in the region where the routing portion 41 is formed is about the same as the size of the area of a segment of the auxiliary capacitance bus line CsL facing the other CS trunk wiring lines bb. Therefore, it is possible to make the overall capacitance formed by the routing portion 41 and the other CS trunk wiring lines bb and between the wiring lines L2s and L2b and the other CS trunk wiring lines bb even more uniform among all of the auxiliary capacitance bus lines CsL, without adjusting the width of the wiring line of the routing portion 41 with respect to the other wiring lines in order to adjust the capacitance.

Furthermore, because the lengths of the wiring lines L2a and L2b vary in accordance with the length of the routing portion 41, it is possible to maintain a constant overall capacitance, even when the routing portion 41 forms any capacitance between itself and other CS trunk wiring lines bb which are not connected. Therefore, uniformity in brightness can be achieved by routing, regardless of the width of the CS trunk wiring line bb. This is particularly advantageous for CS trunk wiring lines bb having narrower wiring line widths, because the number of the CS trunk wiring lines which the routing portion 41 may face can vary greatly.

For the auxiliary capacitance bus line CsL connected to the CS trunk wiring line bb at the innermost location in CS trunk wiring group BB1 or BB2, a segment of the feed portion F that is on the CS trunk wiring line bb on the inner side of the CS trunk wiring line bb to which the feed portion F is connected may be composed of two wirings connected parallel to each other.

Furthermore, as shown in regards to the auxiliary capacitance bus line CsL connected to the CS trunk wiring line bb in the innermost side in the CS trunk wiring group BB1, a wiring line L4, the fourth wiring line, may be formed in correspondence with the auxiliary capacitance bus line CsL having the wiring lines L2a and L2b and the wiring lines L3a and L3b. The wiring line L4 extends from the active area AA to a region facing the CS trunk wiring line bb on the outermost side in the CS trunk wiring group BB1 or BB2, parallel to the wiring lines L2a and L2b and the wiring lines L3a and L3b, and is electrically isolated from the wiring lines L2a and L2b and the wiring lines L3a and L3b. There may be a plurality of the wiring lines L4.

With this structure, when a breakage occurs in the routing portion 41 due to, for example, a manufacturing process, it is possible to repair the routing portion 41 by fusing the wiring line L4 to a portion of the routing portion 41 that is open but is still in contact with the point of connection, using a laser beam. Because the portion of the routing portion 41 which routs around the point of connection is susceptible to wire breakage in the pattern, having the extra wiring line L4 is beneficial. Furthermore, the routing portion 41 that has a breakage is preferably cut off using the laser beam during the repair to be electrically isolated from the repaired routing portion 41, in order to prevent a formation of capacitance between itself and the other CS trunk wiring lines bb.

Furthermore, as shown for the auxiliary capacitance bus line CsL connected to the second CS trunk wiring line bb from the inner side of the CS trunk wiring group BB2, the routing portion 41 may be composed of a plurality of wiring lines connected in parallel with each other. This is also applicable to a structure that does not include the second wiring lines and the third wiring lines.

Figure 5:
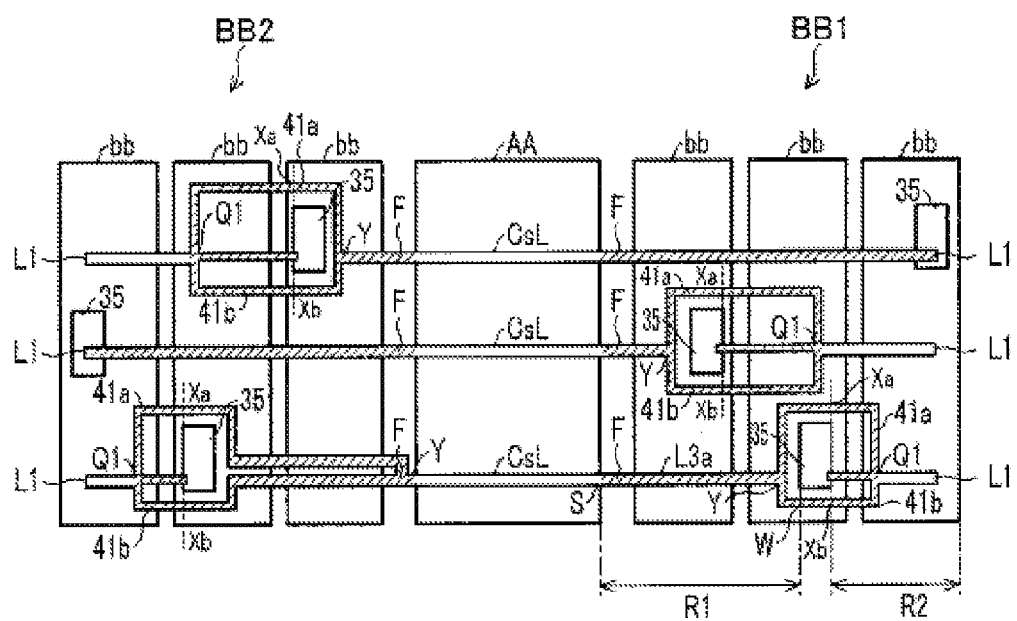
FIG. 5 shows yet another embodiment of the present invention and is a plan view showing the structure of auxiliary capacitance bus lines and CS trunk wiring lines.

Next, yet another wiring line configuration of the auxiliary capacitance bus line CsL and the CS trunk wiring lines bb is shown in FIG. 5. The elements having the same reference characters as FIG. 1 have the same functions, unless specifically stated otherwise.

In FIG. 5, routing in the feed portion F involves a plurality of electrical current paths, and the routing portion 41 includes a first current path 41*a* and a second current path 41*b*, which are connected to each other in parallel, between a point Y in the region R1 and the point Q1 in the region R2. Although the first current path 41*a* and the second current path 41*b* have small wiring line widths, the overall resistance in the routing portion 41 can be reduced. As a result, even when the routing portion 41 is formed in a small space, the feed portion F can be routed using various current paths of small line widths. Furthermore, there may be three or more of the aforementioned current paths, which do not all need to be connected at a single point in the regions R1 and R2, respectively.

Figure 3:
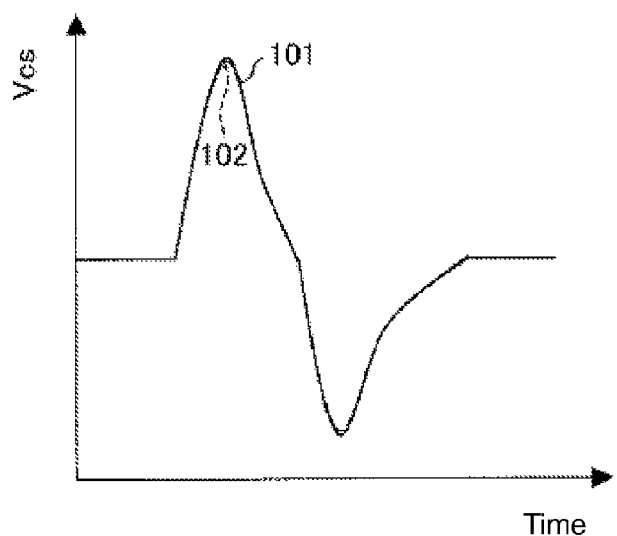
FIG. 3 is a waveform diagram showing the waveforms of ripple voltages of auxiliary capacitance voltages.

FIG. 3 shows a waveform 101 (solid line) of an auxiliary capacitance voltage Vcs of the auxiliary capacitance bus line CsL having a feed portion F connected to the CS trunk wiring line bb on the outer side, at an end portion of the active area AA on the side of the aforementioned feed portion F, and a waveform 102 (broken line) of an auxiliary capacitance voltage Vcs of the auxiliary capacitance bus line CsL having the feed portion F connected to the CS trunk wiring line bb on the inner side, at an end portion of the active area AA on the side of the aforementioned feed portion F. The waveform 101 and the waveform 102 overlap in most part, and the ripple voltages in each are the same.

In the configuration of the aforementioned example, each of the feed portions F of at least all of the auxiliary capacitance bus lines CsL connected to the CS trunk wiring lines bb that are not the CS trunk wiring line bb on the outermost side is routed. However, the present embodiment is not limited to this. At least one feed portion F of at least one auxiliary capacitance bus line CsL may be routed. Furthermore, when there is one current flow path into a region on the outer side of the point of connection, from a point of access (point X) to the point of connection, the wiring line length for the aforementioned current flow path does not need to be longer for the aforementioned feed portion connected to the CS trunk wiring line closer to the innermost, and the resistance may be adjusted by changing the line width of the routing portion 41 to an appropriate value. In such a structure, the overall length of the wiring line of the routing portion 41 is adjusted to make the wiring line resistance of the feed portions F the same or similar among all of the CS trunk wiring lines bb belonging to the same CS trunk wiring group BB. Furthermore, a structure in which a single auxiliary capacitance bus line CsL is connected to a plurality of CS trunk wiring lines bb, belonging to the same CS trunk wiring group is also possible. In this case, the wiring paths from the active area AA to each of the points of connection are regarded as separate feed portions F. Furthermore, the aforementioned routing may also be applied to the auxiliary capacitance bus line CsL connected to the CS trunk wiring line bb on the outermost side in the CS trunk wiring group BB1 or BB2.

There may be, in general, a plurality of subpixels included in each pixel, and only the number of the auxiliary capacitance bus lines CsL needs to be modified. As a result, the structure according to the present embodiment for making the ripple voltages uniform can be applied as is.

The structure of the present embodiment, furthermore, may also be applied to a display device of a drive method other than the multi-pixel drive. For example, each pixel may be assigned with a single auxiliary capacitance bus line CsL, and the same auxiliary capacitance voltage Vcs may be applied on different CS trunk wiring lines bb.

The present invention is not limited to the aforementioned embodiments, and various modifications are possible within the limitations described in the claims. That is, embodiments obtained by combining the appropriately modified technological means within the limitations described in the claims are also included in the technologies according to the present invention.

INDUSTRIAL APPLICABILITY

The present invention is preferably for use on a display device in which auxiliary capacitance voltage is applied.

DESCRIPTION OF REFERENCE CHARACTERS

1 liquid crystal display device (display device)
2 display region
22*a*, 22*b* auxiliary capacitance
35 contact hole
41 routing portion
P pixel
sp1, sp2 subpixel
AA active area
CsL auxiliary capacitance bus line
L1 wiring line (first wiring line)
L2*a*, L2*b* wiring lines (second wiring lines)
L3*a*, L3*b* wiring lines (third wiring lines)
R1 region (region to the inner side to the point of connection)
R2 region (region to the outer side of the point of connection)
S start point
X point (point of access)
Q1 point (a point on the feed portion in the region on the outer side of the point of connection)
Q2*a*, Q2*b* points (two different points on the feed portion in the region on the outer side of the point of connection)
Vcs auxiliary capacitance voltage
F feed portion
BB1, BB2 CS trunk wiring group
Bb CS trunk wiring line

The invention claimed is:
1. An active matrix display device,
wherein one end of a plurality of auxiliary capacitance bus lines on a predetermined side is respectively connected through contact holes to at least one of CS trunk wiring lines of a CS trunk wiring group formed in such a way as to extend in a direction orthogonal to the direction in which said auxiliary capacitance bus lines extend in a region adjoining an active area of a display region on said one side of the direction in which said auxiliary capacitance bus lines extend; the other end of said auxiliary capacitance bus lines is respectively connected through contact holes to at least one CS trunk wiring line of a CS trunk wiring group formed in such a way as to extend in a direction orthogonal to the direction in which said auxiliary capacitance bus lines extend in an area adjoining said active area on said other side of the direction in which said auxiliary capacitance bus lines extend; and an auxiliary capacitance voltage is applied to each of said auxiliary capacitance bus lines through said connected CS trunk wiring line, and wherein a feed portion, which is a current flow path segment of said at least one auxiliary capacitance bus line from said active area to a point of connection on at least one CS trunk wiring line in at least one of said CS trunk wiring groups, originates on said active area side, passes through a region on an inner side of said point of connection, the inner side being the side of said active area with respect to each of said CS trunk wiring groups, is routed to a region on an outer side of said point of connection, and is connected to said point of connection.

2. An active matrix display device, wherein one end of a plurality of auxiliary capacitance bus lines on a predetermined side is respectively connected through contact holes to at least one of CS trunk wiring lines among a CS trunk wiring group formed in such a way as to extend in a direction orthogonal to the direction in which said auxiliary capacitance bus lines extend in a region adjoining an active area of a display region on said one side of the direction in which said auxiliary capacitance bus line extends; and an auxiliary capacitance voltage is applied on each of said auxiliary capacitance bus lines through said connected CS trunk wiring line, and wherein a feed portion, which is a current flow path segment of said at least one auxiliary capacitance bus line from said active area to a point of connection on at least one CS trunk wiring line of said CS trunk wiring group, originates on said active area side, passes through a region on an inner side of said point of connection, the inner side being the side of said active area with respect to said group of CS trunk wiring lines, is routed to a region on an outer side of said point of connection, and is connected to said point of connection.

3. The display device according to claim 1, wherein a first wiring line is provided for said auxiliary capacitance bus line connected to a CS trunk wiring line that is not the CS trunk wiring line on the outermost side of said CS trunk wiring group, said first wiring line being formed in such a way as to extend from one point on said feed portion that is in a region on an outer side of said point of connection to a region facing the outermost CS trunk wiring line.

4. The display device according to claim 3, wherein the line width of said feed portion in the region on outer side of said point of connection is smaller than the line width of said first wiring line.

5. The display device according to claim 1, wherein at least said feed portion of said auxiliary capacitance bus line connected to a CS trunk wiring line that is not the CS trunk wiring line on the outermost side of said CS trunk wiring group is laid out with said routing, wherein there is only one path for current flow in said routing that extends into a region on the outer side of said point of connection, from a point of access to said point of connection, and wherein the wiring length of the path for current flow that extends from said point of access to said point of connection is greater for said feed portion connected to the CS trunk wiring line that is closer to the inner side.

6. The display device according to claim 1, wherein second wiring lines are provided for said auxiliary capacitance bus line connected to a CS trunk wiring line that is not the CS trunk wiring line on the outermost side of said CS trunk wiring group, said second wiring lines being formed in such a way as to extend respectively from two different points on said feed portion in a region which faces the outermost CS trunk wiring line, and wherein, for said auxiliary capacitance bus line connected to a CS trunk wiring line that is not a CS trunk wiring line on the innermost side of said CS trunk wiring group, a segment of said feed portion that is in a region of the CS trunk wiring lines on the inner side of the connected CS trunk wiring line, is a third wiring line, which is composed of two lines connected in parallel to each other.

7. The display device according to claim 6, wherein at least one fourth wiring line is provided, which fourth wiring line is formed in such a way as to correspond to said auxiliary capacitive bus line having said second wiring lines and said third wiring lines, extends in parallel with said second wiring lines and said third wiring lines from said active area to a region facing the CS trunk wiring line on the outermost side of said CS trunk wiring group, and is electrically isolated from said second wiring lines and said third wiring lines.

8. The display device according to claim 1, wherein said routing of said feed portion involves a plurality of paths for current flow.

9. The display device according to claim 1, wherein each pixel is composed of a plurality of subpixels, and said plurality of subpixels in said one pixel include respective auxiliary capacitances formed with said auxiliary capacitance bus lines that are not identical.

10. The display device according to claim 9, wherein said auxiliary capacitance voltages for subpixels in a pixel have binary level waveforms in which waveforms have same timings of level shifts and the same cycle, but oscillate within different ranges.

11. The display device according to claim 10, wherein the timings of said level shifts of said auxiliary capacitance voltages differ among the CS trunk wiring lines connected to said auxiliary capacitance bus lines corresponding to different pixels.

12. The display device according to claim 1, wherein each pixel includes auxiliary capacitance that it forms with one of said auxiliary capacitance bus lines.

13. The display device according to claim 12, wherein said auxiliary capacitance voltage is the same among all of said auxiliary capacitance bus lines.

14. The display device according to claim 1, wherein the display device is a liquid crystal display device.

15. The display device according to claim 1, wherein the CS trunk wiring lines of said CS trunk wiring group are formed of a source metal, and said auxiliary capacitance bus lines are formed of a gate metal.

* * * * *